United States Patent [19]

Rutherford et al.

[11] 4,419,679
[45] Dec. 6, 1983

[54] GUADRASCAN STYLI FOR USE IN STAGGERED RECORDING HEAD

[75] Inventors: Sherman L. Rutherford, Portola Valley; Arthur E. Bliss, Sunnyvale; Noel J. Schmidt, Palo Alto, all of Calif.

[73] Assignee: Benson, Inc., San Jose, Calif.

[21] Appl. No.: 155,937

[22] Filed: Jun. 3, 1980

[51] Int. Cl.³ .................... G01D 15/06; G03G 15/44
[52] U.S. Cl. .................................. 346/155; 346/154
[58] Field of Search ............... 346/155, 139 C, 74.5, 346/150, 153.1, 154; 358/300; 107/DIG. 13

[56] References Cited

U.S. PATENT DOCUMENTS

| | | | |
|---|---|---|---|
| 3,157,456 | 11/1964 | Kikuchi | 346/153.1 |
| 3,551,661 | 12/1970 | Bliss | 235/155 |
| 3,564,537 | 2/1971 | Lee | 340/347 |
| 3,611,419 | 10/1971 | Blumenthal | 346/155 |
| 3,624,661 | 11/1971 | Shebanow et al. | 346/155 |
| 3,702,001 | 10/1972 | Gassino et al. | 346/155 X |
| 3,757,036 | 9/1973 | Libbet et al. | 358/300 X |
| 3,769,628 | 10/1973 | Kenny | 346/154 |
| 3,792,495 | 2/1974 | Bliss et al. | 346/155 |
| 3,797,021 | 3/1974 | Hida et al. | 346/162 |
| 3,798,609 | 3/1974 | Frohbach | 346/153 |
| 3,852,521 | 12/1974 | Bliss et al. | 358/256 |
| 3,903,594 | 9/1975 | Koneval | 346/155 X |
| 3,945,019 | 3/1976 | Ueno et al. | 346/155 X |
| 4,030,107 | 6/1977 | Tagawa | 346/155 |
| 4,052,714 | 10/1977 | Peterson | 346/155 |
| 4,063,255 | 12/1977 | Bahr et al. | 346/155 X |
| 4,131,986 | 1/1979 | Escriva et al. | 29/592 R |
| 4,165,514 | 8/1979 | Ishima | 346/139 C X |
| 4,189,736 | 2/1980 | DeFillips | 346/139 C |
| 4,215,355 | 7/1980 | Moore | 346/139 C X |

Primary Examiner—Aristotelis M. Psitos
Attorney, Agent, or Firm—Alan H. MacPherson; Steven F. Caserza; Richard Franklin

[57] ABSTRACT

A recording head for use in an electrostatic printer comprises four staggered rows of styli. Signals for driving each row of styli are transmitted through a buffer wherein the signals for the first row of styli are transmitted without delay to the styli, the signals for the second row of styli are transmitted with an appropriate delay of a first selected time, the signals for the third row of styli are transmitted with an appropriate delay of a second selected time and the signals for the fourth row of styli are transmitted with an appropriate delay of a third selected time. The delay means comprises a random access memory driven by address counters controlled by a control sequencer to function as a delay. The four staggered rows of styli are formed by a novel method wherein the styli in the second row are formed between the styli in the first row and the stylis in the third and fourth rows are formed by making use of the grooves formed between the styli in the first and second rows. By forming the rows of styli on a cylindrical drum, two recording heads are obtained from each fabrication run wherein the recording head in one set of styli is the mirror image of the recording head in the other set of styli. Should an error occur in the manufacture of the styli by placing the third row of styli in the grooves where the fourth row of styli normally belongs, the resulting recording heads are identical to those obtained with the proper placement of the third and fourth rows with the exception that the position on the drum of each type of recording head is reversed.

8 Claims, 20 Drawing Figures

THIS INVENTION

FIG. 6A

| STATE | TEST | NEXT ADDRESS TRUE | NEXT ADDRESS FALSE | TIMER LD | TIMER INC | BCNTR CLR | BCNTR INC | MEMORY EN | MEMORY WRT | MEMORY INC | H.V. DRIVERS RST | H.V. DRIVERS WRT | H.V. DRIVERS ADV/STB | CNTL ORDY | CNTL ZERO | CNTL STATO | SPARE 1 | SPARE 2 | SPARE 3 | SPARE 4 | SPARE 5 | NOTE |
|---|---|---|---|---|---|---|---|---|---|---|---|---|---|---|---|---|---|---|---|---|---|---|
| 0 | START | 1 | 0 | | | | x | | | | | | | | | x | x | | | | | WAIT FOR START |
| 1 | TRUE | 2 | 2 | | | | x | | | | | | x | | | | x | | | | | EARLY BP ADV |
| 2 | TRUE | 3 | 3 | x | | | x | | | | | | | | | | x | | | | | LOAD TIMER |
| 3 | TMOUT | 4 | 3 | | x | | x | | | | | | | | | | x | | | | | WAIT FOR TMOUT |
| 4 | TRUE | 5 | 5 | x | | | x | | | | | | | | | | x | | | | | LOAD TIMER |
| 5 | TMOUT | 6 | 5 | | x | | | | | | | | | | | | x | | | | | WAIT FOR TMOUT |
| 6 | TUDRY | 7 | 6 | | | | | | | | | | | x | | | x | | | | | WAIT FOR OREHD |
| 7 | GO | 8 | 7 | x | | | | x | | | | x | | | | | x | | | | | ENABLE MEMORY |
| 8 | TRUE | 9 | 9 | | x | | | x | | | | x | | x | | | x | | | | | WAIT FOR ACCESS T |
| 9 | TRUE | 10 | 10 | | x | | | x | | | | x | | x | | | x | | | | | READ DATA |
| 10 | TRUE | 11 | 11 | | x | | | x | x | | | x | | x | | | x | | | | | WRITE NEW DATA |
| 11 | TRUE | 12 | 12 | | x | | | | | x | | x | | x | | | x | | | | | DISABLE MEM. WRT |
| 12 | TRUE | 13 | 13 | | x | | | | | x | | x | | | | | x | | | | | DISABLE MEMORY |
| 13 | TRUE | 14 | 14 | | x | | x | | | x | | x | | | | | 0 | | | | | INC MEM. ADD. |
| 14 | TMOUT | 15 | 14 | | x | | | | | x | | x | | | | | x | | | | | WAIT FOR TMOUT |
| 15 | DMA | 16 | 6 | | | | | | | | | x | | | | | x | | | | | DMH = DONE? |
| 16 | EQUAL | 21 | 17 | | | | | | | | | x | | | x | | x | | | | | BCNT = 15? |
| 17 | TRUE | 18 | 18 | x | | | | | | | | x | | | x | | x | | | | | FILL LAST WORD |
| 18 | TRUE | 19 | 19 | | x | | x | | | | | x | | x | | | x | | | | | READ FORCED ZERO |

FIG. 6B

| STATE | TEST | NEXT ADDRESS TRUE | NEXT ADDRESS FALSE | TIMER LD | TIMER INC | BCNTR CLR | BCNTR INC | MEMORY EN | MEMORY WRT | H.V. DRIVERS RST | H.V. DRIVERS WRT | H.V. DRIVERS ADV/STB | CNTL ORDY | CNTL ZERO | CNTL STATO | MADI 1 | SPARE 2 | SPARE 3 | SPARE 4 | SPARE 5 | NOTE |
|---|---|---|---|---|---|---|---|---|---|---|---|---|---|---|---|---|---|---|---|---|---|
| 19 | TMOUT | 20 | 19 |  | x |  |  |  |  |  |  |  |  |  |  |  |  |  |  |  | WAIT FOR TMOUT |
| 20 | EQUAL | 21 | 17 |  |  |  |  |  |  |  | x |  |  | x |  | x |  |  |  |  | BCNT=15 ? |
| 21 | TRUE | 22 | 22 | x |  |  |  |  |  |  | x |  |  | x |  | x |  |  |  |  | TURN OF LAST WORD |
| 22 | TRUE | 23 | 23 |  | x |  | x |  |  |  | x | x |  | x |  | x |  |  |  |  | READ ZERO BYTE |
| 23 | TMOUT | 24 | 23 |  | x |  |  |  |  |  | x |  |  | x |  | x |  |  |  |  | WAIT FOR TIME 1a |
| 24 | EQUAL | 25 | 21 | x |  |  |  |  |  |  | x |  |  | x |  | x |  |  |  |  | BCNT=15 ? |
| 25 | TMOUT | 26 | 25 |  | x |  |  |  |  |  | x |  |  | x |  | x |  |  |  |  |  |
| 26 | EQUAL | 0 | 21 |  |  |  |  |  |  |  |  |  |  |  |  | x |  |  |  |  |  |

FIG. 6C

WRITE SEQUENCE CONTROLLER PROM #1 (LSD) LOCATION F2

FUNCTION / F2

| Addr. | NAT4 (7) | NAT3 (6) | NAT2 (5) | NAT1 (4) | NAT0 (3) | TST2 (2) | TST1 (1) | TST0 (0) | Octal | Notes |
|---|---|---|---|---|---|---|---|---|---|---|
| 0 | | | | | X | X | | X | 015 | 015 |
| 1 | | | | X | | | | | 020 | 020 |
| 2 | | | | X | X | | | | 030 | 030 |
| 3 | | | X | | | X | X | | 046 | 046 |
| 4 | | | X | | X | | X | X | 053 | 053 |
| 5 | | | X | X | | | | | 060 | 060 |
| 6 | | | X | X | X | X | X | X | 077 | |
| 7 | | X | | | | | X | | 102 | |
| 8 | | X | | | X | | | | 110 | |
| 9 | | X | | X | | | | | 120 | |
| 10 | | X | | X | X | | | | 130 | |
| 11 | | X | X | | | | | | 140 | |
| 12 | | X | X | | X | | | | 150 | |
| 13 | | X | X | X | | X | X | | 166 | |
| 14 | | X | X | X | X | X | | | 174 | |
| 15 | X | | X | | | | X | X | 243 | |
| 16 | X | | | | X | | | | 210 | |
| 17 | X | | | X | | | | | 220 | |
| 18 | X | | | X | X | X | X | | 236 | |
| 19 | X | | X | | | | X | X | 243 | |
| 20 | X | | X | | X | | | | 250 | |
| 21 | X | | X | X | | | | | 260 | |
| 22 | X | | X | X | X | X | X | | 276 | |
| 23 | | | | | | | X | X | 03 | |
| 24 | X | X | | | X | | | | 0 | 310 310 |
| 25 | X | X | | X | | X | X | | 0 | 326 320 |
| 26 | | | | | | X | X | | 0 | 003 003 |
| 27 | | | | | | | | | 0 | |
| 28 | | | | | | | | | 0 | |
| 29 | | | | | | | | | 0 | |
| 30 | | | | | | | | | 0 | |
| 31 | | | | | | | | | 0 | |

FIG. 6D

WRITE SEQUENCE CONTROLLER PROM #2 LOCATION F3

FUNCTION: BCCLR, STTMR, LDTMR, NAF4, NAF3, NAF2, NAF1, NAF0 — F3

| Addr | 7 | 6 | 5 | 4 | 3 | 2 | 1 | 0 | Octal | Notes |
|---|---|---|---|---|---|---|---|---|---|---|
| 0 | X | | | | | | | | 200 | 200 |
| 1 | | | | | | | X | | 02 | 002 |
| 2 | | | X | | | | X | X | 043 | 043 |
| 3 | | X | | | | | X | X | 103 | 103 |
| 4 | | | | | | | X | | 02 | 002 |
| 5 | X | | | | | X | X | | 206 | 206 |
| 6 | | | | | | X | X | | 06 | |
| 7 | | | X | | | X | X | X | 047 | |
| 8 | | X | | | X | | | X | 111 | |
| 9 | | X | | | X | | X | | 112 | |
| 10 | | X | | | X | | X | X | 113 | |
| 11 | | X | | | X | X | | | 114 | |
| 12 | | X | | | X | X | | X | 115 | |
| 13 | | X | | | X | X | | X | 115 | |
| 14 | | | | | | X | X | | 06 | |
| 15 | | | | X | | | | | 020 | |
| 16 | | | X | X | | | | X | 061 | |
| 17 | | X | | X | | | X | | 122 | |
| 18 | | X | | X | | | X | | 122 | |
| 19 | | | | X | | | | | 020 | |
| 20 | | | X | X | | X | | X | 065 | |
| 21 | | X | | X | | X | X | | 126 | |
| 22 | | X | | X | | X | X | | 126 | |
| 23 | | | | X | | X | | | 024 | |
| 24 | | | X | X | X | | | X | 0 | 071 031 |
| 25 | | X | | X | X | | | X | 0 | 131 032 |
| 26 | | | | X | | X | | X | 0 | 025 025 |
| 27 | | | | | | | | | 0 | |
| 28 | | | | | | | | | 0 | |
| 29 | | | | | | | | | 0 | |
| 30 | | | | | | | | | 0 | |
| 31 | | | | | | | | | 0 | |

FIG. 6E

WRITE SEQUENCE CONTROLLER PROM #3 LOCATION F6

F8

| Addr. | STB 7 | BPADV 6 | HVWRT 5 | HVRST 4 | MINC 3 | MWRT 2 | MENAB 1 | BINC 0 | Octal | Notes |
|---|---|---|---|---|---|---|---|---|---|---|
| 0 | | | | X | | | | | 020 | |
| 1 | | X | | | | | | | 0100 | |
| 2 | | | | | | | X | | 001 | |
| 3 | | | | | | | | | 0 | |
| 4 | | | | | | | | | 0 | |
| 5 | | | | | | | | | 0 | |
| 6 | | | X | | | | | | 040 | |
| 7 | | | X | | | X | | | 042 | |
| 8 | | | X | | | X | | | 042 | |
| 9 | X | | X | | | X | | | 0242 | |
| 10 | | | X | | X | X | | | 046 | |
| 11 | | | X | | | X | | | 042 | |
| 12 | | | X | X | | | X | | 051 | |
| 13 | | | X | | | | | | 040 | |
| 14 | | | X | | | | | | 040 | |
| 15 | | | X | | | | | | 040 | |
| 16 | | | X | | | | | | 040 | |
| 17 | X | | X | | | | X | | 0241 | |
| 18 | | | X | | | | | | 040 | |
| 19 | | | X | | | | | | 040 | |
| 20 | | | X | | | | | | 040 | |
| 21 | X | | X | | | | X | | 0241 | |
| 22 | | | X | | | | | | 040 | |
| 23 | | | X | | | | | | 040 | |
| 24 | | | X | | | | | 0 | | 040 |
| 25 | | | X | | | | | 0 | | 040 |
| 26 | | | X | | | | | 0 | | 040 |
| 27 | | | | | | | | | 0 | |
| 28 | | | | | | | | | 0 | |
| 29 | | | | | | | | | 0 | |
| 30 | | | | | | | | | 0 | |
| 31 | | | | | | | | | 0 | |

FIG. 6F

WRITE SEQUENCE CONTROLLER PROM #4 (MSD) LOCATION F4

F4

FUNCTION: GPINC, BPSTB, MADI-

| Addr | 7 SPARE | 6 SPARE | 5 SPARE | 4 SPARE | 3 SPARE/GPINC | 2 STAT0/BPSTB | 1 ZERO1/MADI- | 0 RDY | Octal | Notes |
|---|---|---|---|---|---|---|---|---|---|---|
| 0  |  |  |  |  | X | X |  |  | 04 | 014 |
| 1  |  |  |  |  | X |  |  |  | 0  | 010 |
| 2  |  |  |  |  | X |  |  |  | 0  | 010 |
| 3  |  |  |  |  | X |  |  |  | 0  | 010 |
| 4  |  |  |  |  | X |  |  |  | 0  | 010 |
| 5  |  |  |  |  | X |  |  |  | 0  | 010 |
| 6  |  |  |  |  | X |  | X |  | 01 | 011 |
| 7  |  |  |  |  | X |  | X |  | 01 | 011 |
| 8  |  |  |  |  | X |  | X |  | 01 |  |
| 9  |  |  |  |  | X |  | X |  | 01 |  |
| 10 |  |  |  |  | X |  | X |  | 01 |  |
| 11 |  |  |  |  | X |  | X |  | 01 |  |
| 12 |  |  |  |  | X |  |  |  | 0  |  |
| 13 |  |  |  |  |   |  |  |  | 0  |  |
| 14 |  |  |  |  | X |  |  |  | 0  |  |
| 15 |  |  |  |  |   |  |  |  | 0  |  |
| 16 |  |  |  |  |   | X |  |  | 02 |  |
| 17 |  |  |  |  |   | X |  |  | 02 |  |
| 18 |  |  |  |  |   | X |  |  | 02 |  |
| 19 |  |  |  |  |   | X |  |  | 02 |  |
| 20 |  |  |  |  |   | X |  |  | 02 |  |
| 21 |  |  |  |  |   | X |  |  | 02 |  |
| 22 |  |  |  |  |   | X |  |  | 02 |  |
| 23 |  |  |  |  |   | X |  |  | 02 |  |
| 24 |  |  |  |  | X | X |  |  | 0  | 012 |
| 25 |  |  |  |  | X | X |  |  | 0  | 012 |
| 26 |  |  |  |  | X | X |  |  | 0  | 012 |
| 27 |  |  |  |  |   |  |  |  | 0  |  |
| 28 |  |  |  |  |   |  |  |  | 0  |  |
| 29 |  |  |  |  |   |  |  |  | 0  |  |
| 30 |  |  |  |  |   |  |  |  | 0  |  |
| 31 |  |  |  |  |   |  |  |  | 0  |  |

FIG. 7A
FIG. 7B
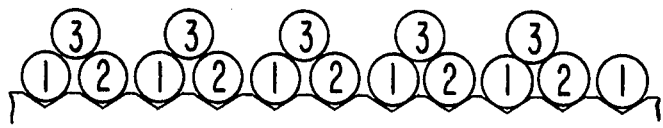
FIG. 7C
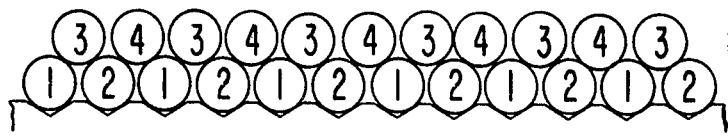
FIG. 7D
FIG. 8
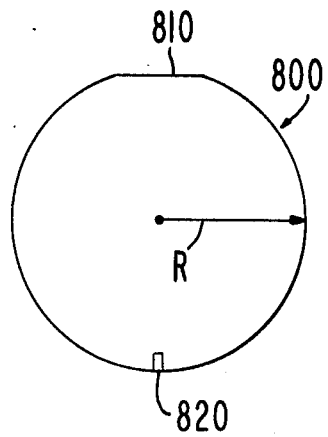
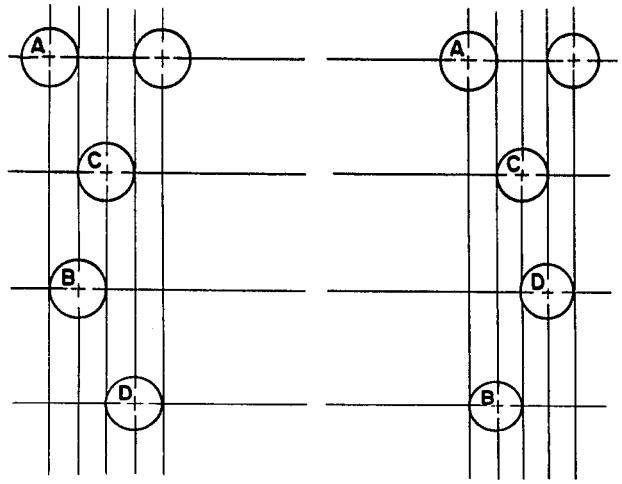
FIG. 9A    FIG. 9B

GUADRASCAN STYLI FOR USE IN STAGGERED RECORDING HEAD

FIELD OF THE INVENTION

This invention relates generally to electrostatic recording and particularly to a recording head having four staggered rows of styli and the associated driving circuitry for increasing the quality of the recorded images.

PRIOR ART

A staggered styli electrostatic recording apparatus is disclosed in patent application Ser. No. 475,556 filed June 3, 1974 (now abandoned) and assigned to Varian Associates, 611 Hansen Way, Palo Alto, Calif. 94303. As disclosed in this application, a styli recording head containing two rows of styli, one row staggered with respect to the other, was used to reduce the gap between adjacent dots in the image produced by the recording head. Data control circuitry for activating the rows alternately as the writing surface passed the styli allowed the front row to first write while holding the back row inactive and then allowed the back row to write as the images on the recording medium formed by the front row reached the back row. By properly staggering the back row relative to the front row, the back row styli wrote in the spaces between the charge dots laid down by the front row thereby reducing the gap between adjacent charged dots in the resulting image. Other patents and applications relating to the electrostatic recording head art are cited on pages 2 and 3 of application Ser. No. 475,556. Other patents also disclosing the use of two rows of staggered printing styli or electrodes for the purpose of increasing the density of printed information while at the same time reducing the likelihood of electrical breakdown between adjacent electrodes or styli include U.S. Pat. Nos. 3,797,021 and 3,798,609, which both disclose the use of two staggered rows of printing styli and U.S. Pat. No. 3,157,456 which discloses the use of a plurality of square dot forming elements arranged in a staggered line wherein each group of element is capable of forming a continuous character without discontinuity between the dots.

U.S. Pat. No. 3,611,419 discloses the use of three staggered rows of recording styli for denser recording.

Among the problems associated with the prior art staggered styli has been the fact that even though the spacing between each stylus in each staggered row of styli is greater than the spacing between the styli in a recording head wherein the same number of styli are placed all in one row and, therefore, breakdown voltages across the insulation between adjacent styli are increased while line quality is also improved, line quality still is less than desirable. The eye is quite sensitive to spatial noise on a line edge, especially when the amplitude and spatial frequency of the noise are near the threshold of detection of the eye. This threshold for normal human eyes at reading distance is equivalent to an amplitude of between 1-3 mils. In the prior art, at a resolution of 200 points per inch, 5 mil diameter dots would be written on 5 mil centers. Thus the line edge, for a perfectly formed line, would have excursions of one-half dot diameter (2.5 mil) occurring every 5 mils. In addition, spurious dots, having an irregular shape and random occurrence on the edge of the line, and having an average size of between 1-5 mils, are present at a frequency of a few to several per inch of line, when using the prior art. Accordingly, the resulting line-edge noise, being the combination of the regular, periodic excursions associated with the dot edges and the irregular excursions associated with spurious dots, is excessive and annoying to an observer, making characters and line images difficult to accept.

SUMMARY OF THE INVENTION

This invention substantially overcomes the deficiencies of the prior art proposals by providing a configuration of staggered rows of styli sufficient to reduce line edge noise amplitude to a value below the human visual threshold for annoyance. Contrary to expectation, by use of the staggered row configuration of this invention, a line printing capability is achieved which reduces substantially the noise frequency on each line (use of only two staggered rows gives a relatively large amplitude and frequency of noise) and which also reduces spurious discharges across the insulation between styli thereby providing better image quality.

In the prior art, each styli is charged with 600-700 volts during the writing of an image on the underlying recording medium. A wire, therefore, is likely to discharge across the insulation between it and an adjacent wire thereby creating a blurred image. The structure of this invention, on the other hand, substantially increases the spacing between adjacent wires while at the same time improving the quality of the resulting coverage. Interestingly, larger dots are capable of being used with this invention than with the prior art resulting in both a reduction in noise and reduction in the formation of spurious dots due to arcing from one styli to an adjacent styli.

In accordance with this invention, an electrostatic recording head comprises four separated, staggered rows of styli. In one embodiment, the dots in each row of styli are spaced 20 mils center to center and each dot has a 9.6 mils diameter. The adjacent rows of styli are 20 mils apart center-to-center. Each of the four rows is offset five mils from the preceding row such that when four rows are projected onto one row, a dot center occurs every 5 mils along the axis connecting all the dots. The result is a substantial reduction in the visible noise associated with the line and a substantial increase in the image quality compared to the prior art. This improvement in image quality results from dot overlap, smoother line edges and reduced spurious discharging.

DESCRIPTION OF THE DRAWINGS

FIGS. 6A and 6B show the functional outputs for each step of the PROM controller sequencer 130 shown in FIG. 5.

FIGS. 6C, 6D, 6E and 6F show the program in each of the four PROMs included in sequencer 130.

FIGS. 7A to 7D show cross-sections through several of the styli after each row has been wound on the drum used in forming the recording head of this invention.

FIG. 8 shows in side view the double threaded drum with flat section and diametrically opposed cutting groove used to form two recording heads in accordance with this invention.

FIGS. 9A and 9B show the narrow image four staggered row recording heads produced from each run of the process for manufacturing the recording head of this invention.

DETAILED DESCRIPTION

Figure 1:
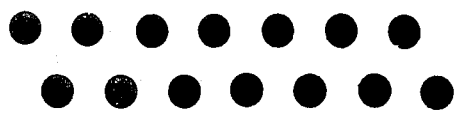
FIG. 1 discloses the prior art two row configuration of styli.

FIG. 1 shows the prior art recording head comprising two staggered rows of styli. Typically, each styli comprises a conductive wire of copper or some suitable alloy surrounded by insulation. Each wire is typically spaced from adjacent wires in the same row by 0.010 inches (ten mils) and from closest adjacent wires in the second row by 0.010 inches. One common problem with the prior art dual row structure is the excessive noise generated both by the non-uniformness of the image lines produced by this structure (due to the non-overlap of the dots produced by the styli) and by spurious wires being activated by capacitive coupling from adjacent wires charged to a high voltage. In a typical prior art recording head, each wire has a diameter of about 0.006 inches.

Figure 2A:
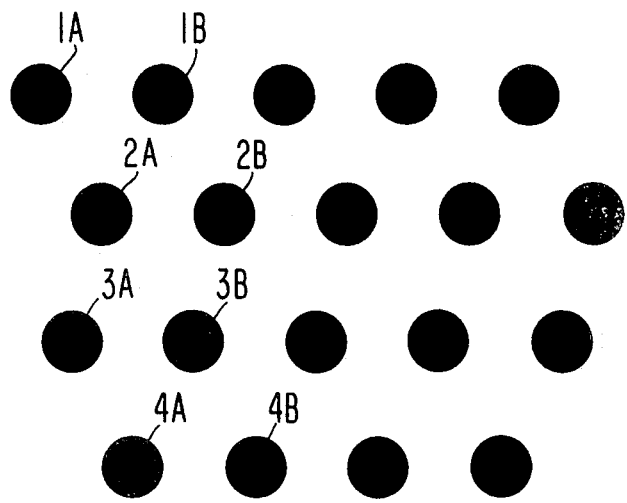
FIG. 2A shows the four row configuration of styli of this invention.

FIG. 2A shows the structure of this invention wherein four rows of styli each staggered relative to the other rows, are used to write characters or lines. In one embodiment each wire has a diameter of 0.0096 inches and is spaced from the adjacent wires in the same row by 20 mils. Each row of styli is spaced from the closest adjacent row of styli by 20 mils. The result of this structure is to produce characters or lines with a much smoother appearance than prior art characters or lines and with substantially no spurious writing due to capacitive coupling between adjacent wires. As shown in FIG. 2A, in one configuration, the first and second rows are spaced such that the dots in the second row fall directly between the space between the dots in the first row. Then the dots in the third and fourth rows are likewise similarly spaced, but shifted by one-half dot diameter relative to the dots of the first and second row. The result is a dot capable of appearing every dot radius along the line so as to reduce the roughness of each line and at the same time increase the percentage of the paper covered by dots so as to produce smoother lines. The larger spacing between styli also allows each styli to have a larger cross-sectional area than prior art styli.

Figure 2B:
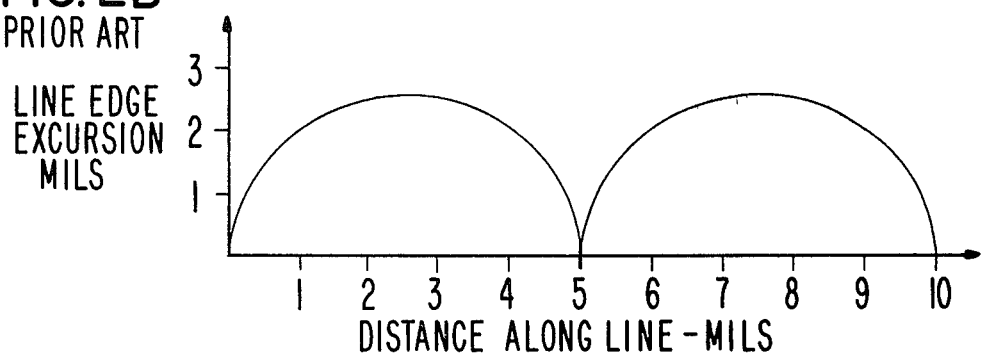
FIG. 2B shows the line edge noise frequency and amplitude for the prior art.

FIG. 2B shows a plot of the line edge profile for the prior art staggered array in which the dot diameter is equal to the distance between the centers of the dots. This plot demonstrates the excursions of almost one-half dot diameter occurring at each dot edge. These excursions exceed the amplitude of noise which is easily detectable and annoying at reading distance with a human observer.

Figure 2C:
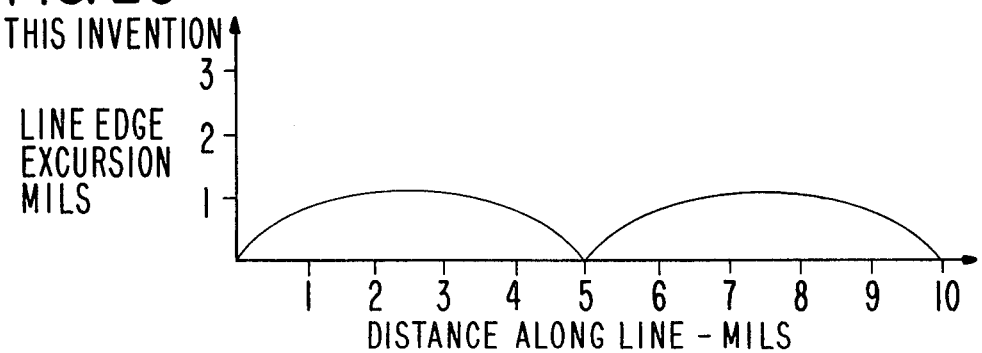
FIG. 2C shows the decreased line edge noise frequency and amplitude for this invention.

FIG. 2C shows a plot of line edge profile for this invention in which the dot diameter is approximately equal to twice the distance between the centers of the dots. This plot demonstrates the substantial reduction in the excursions occurring at each dot edge to an amplitude which is below the value easily detectable and annoying to a human observer.

The plan view of the electrostatic writing head matrix shown in FIG. 2A represents of the ends of the electrostatic writing wires (i.e., styli) as these wires appear to the recording member such as a paper passing next to the recording head. In the manufacture of this recording head, the four rows of wires are wound on a double-threaded cylinder with each layer of wires being separated from the other layers of wire at the point where the wires will be cut from the cylinder by a tape (i.e., spacer) with a thickness equal to the separation desired between the rows of wires. The wires are bonded to the spacer using an epoxy which fills the interstitial spaces between the insulated wires. The cylindrical four layer wire structure is cut and peeled off the cylinder and the four layers of wire, held together by the epoxy and separated by the spacer, are then embedded in a plastic and the ends are then machined to a uniform planarity sufficient to provide the desired quality of print.

Figure 3:
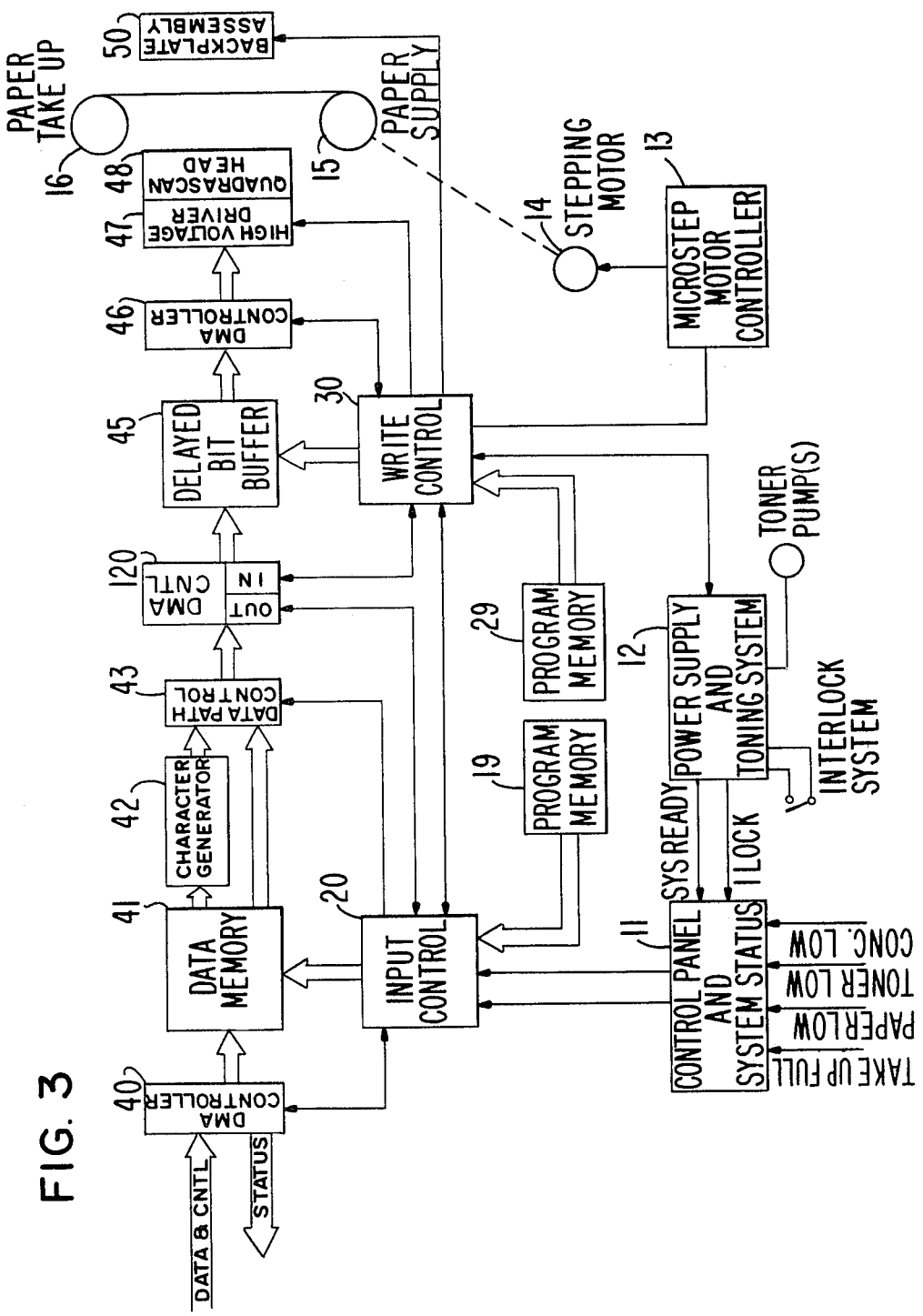
FIG. 3 shows schematically the driving circuitry required to drive the four row staggered styli of this invention shown in FIG. 2.
Figure 4:
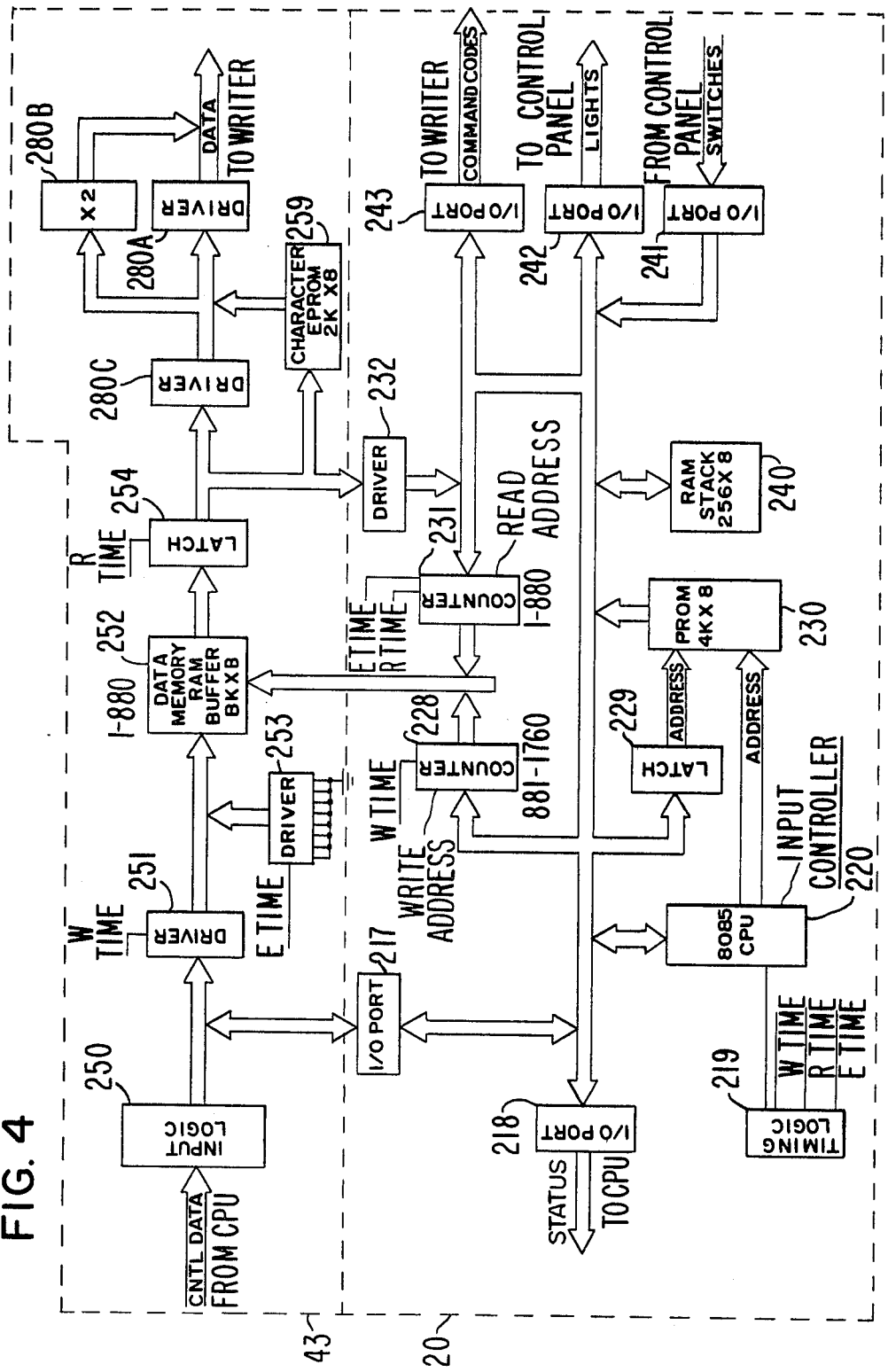
FIG. 4 shows in more detail parts of the input control block diagram depicted in FIG. 3.
Figure 5:
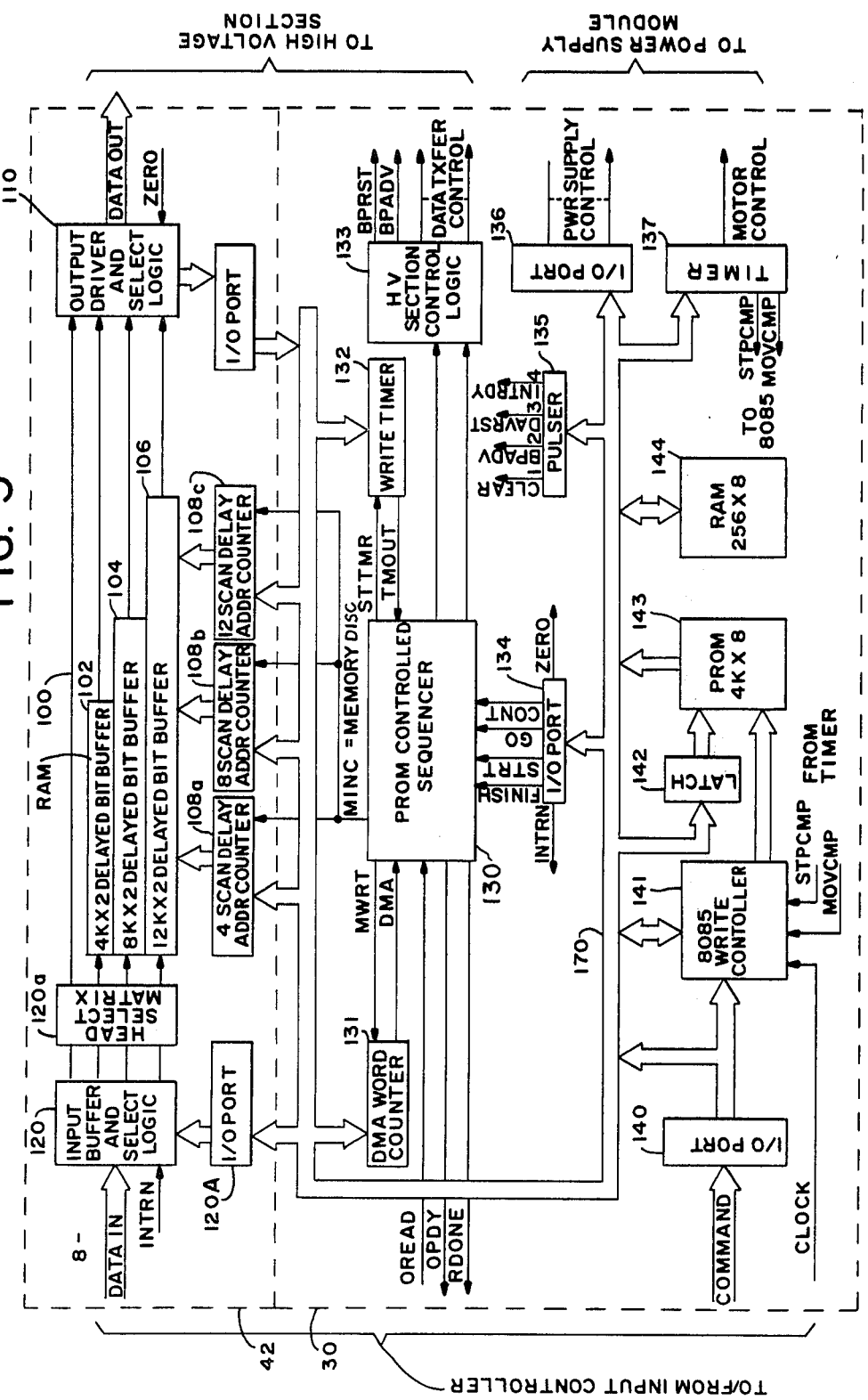
FIG. 5 shows in more detail parts of the write control block diagram depicted in FIG. 3.

FIG. 3 illustrates in schematic block diagram form, the logic circuitry used to activate the four staggered rows of styli described above and in FIG. 2A. FIG. 4 illustrates in schematic block form the circuitry associated with the input control 20 in FIG. 3 while FIG. 5 illustrates in schematic block form the circuity associated with write control 30 in FIG. 3. The following description supplements that given in the document entitled "Service and Maintenance Manual" published in February 1980 by Benson-Varian of 385 Ravendale Drive, Mountain View, Calif. 94043 and subtitled "users Manual, Model 9236 Printer/Plotter, Publication No. 03-996363B". This document is incorporated herein by reference. As shown in FIG. 3, data and control signals are input to the logic for driving the recording head through a direct memory access controller 40 which also sends status signals back to the data and control signal source. Direct memory access controller 40, a type well-known in the semiconductor arts, transmits the data and control signals to data memory 41. Memory 41 (shown as memory 252 in FIG. 4) is controlled by input control 20 which in turn is responsive to signals from control panel 11 (which reflect the status of the printer and the various subsystems within the printer), the program memory 19 (which controls the logic operation of input control 20) and signals from write control 30 (which controls the activation of the various styli in the recording head) as well as signals from several functional elements in the data path such as data path control 43 and direct memory access control 120. Data memory 41 comprises a RAM memory controlled to operate like a buffer. Typically data memory 41 comprises an 8K by 8 memory, thus providing 8,192 bytes of memory. The data stored in memory 41 is then transmitted to data character generator 42 or alternatively directly to data path control 43 which controls the transmittal of data to delayed bit buffer 45 through direct memory access control 120. Character generator 42 typically comprises an EPROM (shown as 259 in FIG. 4) containing 2K by eight bits which is used to convert ASCII data into a series of 16×16 dot patterns (representing 123 characters) suitable for printing on the electrostatic printer plotter. The alternate data transfer path which bypasses character generator 42 transmits data directly to data path control 43 (corresponding to latch 254, driver 280C and drivers 280A and 280B shown in FIG. 4). The data from driver 280A or 280B is transmitted directly to input buffer and select logic 120 (FIG. 5) and from logic 120 to either output driver and select logic 110 on line 100 or to one of three RAM memories, 102, 104 and 106 which serve as buffers for selectively delaying selected bits of information. RAM 102 (FIG. 5) comprises 4K by two bits while RAM 104 comprises 8K by two bits and RAM 106 comprises 12K by two bits. These RAMs function under the control of PROM control sequencer 130, write controller 140 and PROM 143 and RAM 144 to allow eight staggered styli in four rows of styli to simultaneously write information on the paper or other recording medium in the proper location so that the resulting image is correctly depicted. This sequence will be explained below in more detail.

FIG. 3 also shows the relationship of write control 30 (referred to above) to delayed bit buffer 45, input control 20, and program memory 29 which controls the sequence of operation of write control 30. In addition, a signal from power supply and toning system 12 is transmitted to write control 20 to inhibit the operation of control 30 should the toner be depleted or the power supply malfunction.

The direct memory access control 46 (FIG. 3) between delayed bit buffer 45 and high voltage driver circuits 47 (shown in more detail in the Service and Maintenance Manual cited above which is incorporated by reference) drives quadrascan head 48 to record the desired image on the recording medium, shown as paper, for example. The paper is driven from paper supply drum 15 to paper takeup drum 16. On the opposite side of the paper is backplate assembly 50. As is known in the art, backplate 50 is maintained at a potential no more than 200 volts or so different from that of the styli. When a given styli is to write on the recording medium, the backplate voltage associated with that styli is changed, for example, from 200 volts to 600 volts while the output voltage from the driver associated with a given styli is changed (for example, from typically 400 volts to typically 0 volts). The result is to create a voltage difference from the backplate to the writing styli of about 600 volts while the styli not to be activated remain within about 200 volts of the backplate. As is known, one cannot write on the recording medium with only 200 volts difference between the styli and the backplate (about 350 volts is the writing threshold). Accordingly, the desired styli are activated to write on the paper.

As shown in FIG. 3, microstep motor controller 13 activates stepping motor 14 to drive paper supply 15 in accordance with control signals from write control 30.

As shown in FIG. 5, the operation of the stepping motor 14 is controlled by signals from timer 137 transmitted to motor controller 13. Write controller 30 (FIG. 3) includes write controller microprocessor 141 (shown as an Intel 8085 microprocessor) which has access to a data bus 170 which transmits signals to I/O port 120A for controlling input buffer select logic 120, to direct memory access word counter 131 which controls PROM control sequencer 130 and to address counters 108A, 108B and 108C which control respectively the RAM buffers 102, 104 and 106. Bus 170 also provides signals to timer 132 which interacts with PROM control sequencer 130 and to IO port 134 which produces signals for transmittal to PROM control sequencer 130 and to pulser 135 which generates pulse control signals (as opposed to DC level signals) to various portions of the system.

In now describing the operation of the circuitry disclosed in FIGS. 3, 4 and 5, certain specifications should be borne in mind. The I/O logic levels are designed to utilize a "low-true" logic convention wherein an input logic 1 (true) is about 0.8 volts maximum, whereas an input logic 0 (false) is about 2 volts minimum. An output logic 1 (true) is about 0.4 volts maximum while an output logic 0 (false) is about 2.4 volts minimum. In a typical quadrascan head writing across a total paper width of about 35.12 inches, one scan equals 7,040 bits. That is, one solid line across the width of the paper would comprise 7,040 dots, each dot overlapping the adjacent dot by one-half diameter. This data comprises 880 bytes and each of the four staggered row of styli comprising the quadrascan head of this invention contains 1,760 styli. One raster equals one line of dots across the paper (generated from the four row of styli).

Each row of styli is 20 mils from the adjacent row of styli. However, each step of paper motion comprises 5 mils. Therefore, between each row of styli are four increments of resolution or four scans. The data from input buffer and select logic 120 comprising one byte or eight bits is transmitted to four different places. Two bits are sent on channel 100 to drive two selected styli in the recording head through output driver and select logic 110. Two further bits are delayed by four scans in RAM buffer 102. Two additional bits are delayed by eight scans in RAM buffer 104 while the last two bits are delayed by 12 scans in RAM buffer 106. Thus the styli numbered 1A and 1B (FIG. 2A) are driven directly by the two bits on line 100 (FIG. 5) through logic 110. However, the styli numbered 2A and 2B (FIG. 2A) are driven by two bits from a bit obtained from a line first partially plotted four scans earlier and stored in RAM buffer 102 (FIG. 5). Styli 3A and 3B (FIG. 2A) are driven by two bits corresponding to a line first partially plotted eight scans prior to the scan from which the bits driving styli 1A and 1B have been obtained. These two bits have been stored in RAM buffer 104 (FIG. 5). Similarly, the styli 4A and 4B (FIG. 2A) are driven by two bits stored in RAM buffer 106 (FIG. 5) from a line scanned twelve scans prior to the line from which the bits driving styli 1A and 1B have been derived. In any one scan, 880 bytes must be transmitted in this manner to the appropriate styli in the recording head. It typically takes about 5 milliseconds for one scan of 7,040 bits to be completed. During this time, the underlying paper on which the information is being recorded travels at a typical paper speed of one inch per second. The result is a slight slant or skew in the printed line of at most 5 mils. Such a slant is not perceptible.

In operation, PROM control sequencer 130 sets up an address it desires to read in each of the three RAM buffers 102, 104 and 106, and reads out six bits compatible with the two bits on line 100. The information in each of the RAMs at the desired address is then written over at the same address with new input information and then the address registers 108A, 108B and 108C are incremented to the next address. Standard counting circuits are used for this purpose.

RAM memories are used for buffers 102, 104 and 106 because the amount of memory required for operating the recording head is much too large for the use of shift registers, the standard method of implementing a delay.

FIG. 6A depicts functionally the programming of PROM 130. PROM 130 contains four PROMs eight bits wide. This PROM controls the operation of each scan. At the start of a scan, input control 20 acknowledges an interrupt signal from the DMA controller 40 which means data has been stored in data memory 41 (FIG. 3).

The direct memory access controller 40 has transferred data from the data source into memory 41. The input control 20 then commands write control 30 to start writing the first raster scan. The CPU 220 (FIG. 4) then sets the write addresses counter 228 and the read address counter 231 (FIG. 4) to the proper addresses to read out the proper data in data memory 252. Thus read counter 231 is set to addresses 1 to 880 where each address represents an 8 bit byte. The data for the second raster scan resides in addresses 881 to 1760. Write address counter 228 is set to these addresses.

A command is then sent to the write controller through I/O port 243 from CPU input controller 220 informing the write controller that data is ready to be written. Address counters 108A, 108B and 108C are then set to point to the correct address in RAMs 102, 104 and 106. Sequencer 130 is then commanded to start writing the scan from addresses 1 to 880 in data memory 252 (FIG. 4).

The controller first turns on the first backplate by means of signals transmitted via high voltage section control logic 133 to the data transfer control (FIG. 5).

Each backplate is opposite 256 styli. Each driver drives 14 styli. Thus it takes 32 bytes to complete a raster scan across one backplate. There are 28 backplates opposite a given recording head.

To turn on the first backplate takes about 20 microseconds. However, an 80 microsecond delay is built into the system before the raster scan begins to give the voltage on the first backplate time to settle down to the desired value. This "delay" takes about 2% of the total 5 millisecond scan time. Then a signal is detected comprising INDRY representing "Input Ready." This means the input controller has the first bit ready to transfer to drive the styli.

FIG. 6A illustrates the functional inputs for each step of the PROM controller sequence 130 (FIG. 5). Thus at state 0 the start test is carried out and if this start test is true, the programmer steps to the next state 1. The programmer also resets the high voltage drivers through control logic 133 and the bit counter 131 (FIG. 5). If state 1 is true the bit counter is cleared and the high voltage drivers are advanced. The sequencer steps to state 2 which automatically then sequences to state 3. State 2 loads the timer 132 and continues to clear the bit counters as do all steps through state 5. State 3 tests for "time out", that is, whether or not the preset delay of 80 microseconds has expired. If it has not, the program sequencer 130 remains at state 3. Only when the timer has run out does the sequencer move on to the next step, state 4. State 4 loads the timer and also continues to clear the bit counter. The next step 5 is automatically reached and comprises a second "time out" of 80 microseconds to thereby (in conjunction with the "time out" associated with state 3) give a total delay of 160 microseconds. Once the second time out has been completed, sequencer 130 moves to state 6. State 6 sets the high voltage drivers to write and sets to "output ready" the sequencer 130. Step 7 is reached when state 6 tests true indicating INDRY or input ready, which means the input controller has the first bit ready to transfer. State 7 then loads the timer 132, and enables memory. High voltage driver and control both stay at the write and output ready states, respectively. States 8 through 13 increment the timer and include (in state 10) a writing signal into memory and, in step 11, an incrementing of memory. State 15 corresponds to direct memory access and, if true, goes to state 16, but if false, returns to state 6 for an additional INDRY or input ready signal for the second or $n^{th}$ byte to be transferred. This sequence continues until 880 bytes have been transferred corresponding to one raster scan. The DMA word counter 131 (FIG. 5) controls this count. Every memory write signal increments counter 131 by one unit. When this counter reaches a count of 880, the DMA complete test of state 15 will be true and the sequencer will advance to state 16. From state 16 the system always jumps to state 21 on a true signal. State 21 loads the timer and strobes the high voltage driver signal. This state also increments the bit counters. From state 21 sequencer 130 moves to state 22 which increments bit counters and strobes the high voltage drivers. Then state 23 is reached which measures "time out" again comprising an 80 microsecond timer delay. Address 24 checks again for a full count of 16 which always occurs with 7,040 bits. State 25 again checks for an 80 microsecond delay and state 26 tests for equality which means the last 16 bits are blank. This counter is not shown in the drawings.

The four row staggered recording head described above is manufactured by winding four layers of wire on a precision-threaded drum 800 (shown in cross-section in FIG. 8) rotated on a lathe with a precision guide. The drum has formed on its surface a double thread at a pitch, in one embodiment, of fifty double threads per inch. Each thread comprises a groove approximately 0.002 inches deep at the deepest point which forms an angle of approximately 120°. The angle of the groove, however, is not critical and can vary over a wide range such as, for example, from 60° to 120° or more. One portion of the drum is machined flat for the complete length of the drum to provide a flat surface 810 along the length of the drum about 1.5 inches wide. The drum typically has a diameter of 7.5 inches although a larger diameter will result in a recording head with longer wire leads for use in making connections. In essence, the drum diameter is dictated by the length of the lead required. A groove 820 for use in cutting the wires to remove them from the drum 800 is formed along the length of the drum diametrically opposed to flat 810.

To form the recording head of this invention a first layer of wire is wound on the drum such that a wire is placed in every other threaded groove on the drum. A cross section taken through this first layer of wire relative to the drum is as shown in FIG. 7A. A second layer of wire is then laid down in the threaded groove between each of the wires in the first layer. However, prior to the formation of the second layer of wire, a layer of epoxy is spread along the portion of the wire over the flat of the drum. Then a spacer formed of a suitable material, preferably fiberglass FR4, a standard printed circuit board material, and having a thickness selected such that the spacing between the two rows from center to center is 20 mils, is laid down over the first layer of wire along and over the entire length of the flat portion of the drum surface and over the epoxy. When the wire has a diameter including insulation of about 9.6 mils, the thickness of the spacer is approximately 10.3 mils. The epoxy command used in forming the final head takes up the rest of the space and insures the proper 20 mils spacing between directly adjacent rows.

In addition, a layer of tape is run lengthwise along the drum every sixty (60) degrees around the circumference of the drum to hold the first layer of wires in the proper relative positions.

After the second layer is wound on the drum, the structure looks in cross section as shown in FIG. 7B. An additional layer of epoxy and a spacer identical to the first is then placed over the second row on the flat of the drum, the second row is taped in the same manner as the first row, and the third row is then wound using the groove formed between the first and second rows as the thread. Again, the groove structure comprises a double thread and the resulting cross section of the third layer formed over the first and second layers at a point other than on the flat of the drum looks as shown in FIG. 7C. Again, an additional layer of epoxy and a spacer identical to the first is placed over the third row of wire along the flat of the drum, the third row is taped in the same manner as the first row, and a fourth layer of wire is laid down in the groove between the third layer of wires. The resulting structure when looked at in cross-section at other than the flat of the drum is as shown in FIG. 7D. The fourth row is taped in the same manner as the first row.

The process as described above yields several unexpected advantages. First, the process is self-aligning in that the wires in the first, second, third and fourth rows automatically assume the proper relative positions. Secondly, the use of the epoxy and spacers in the flat of the drum provides the proper thickness between each of the staggered rows of styli in the to-be-formed head. Thirdly, by properly selecting the drum diameter, the correct length of lead wires from the to-be-formed head can be assured to allow two heads, each a mirror image of the other, to be obtained from one winding. This is done by cutting the wound wire on the drum along the length of the drum, the first cut being made diametrically opposed to the flat 810 in groove 820 (to ensure a straight cut and prevent damage to the drum 880). The second cut is made after removing the wound wire from the drum along that portion of the wound wire formerly adjacent the flat 810 of drum 800.

To form the head, a layer of epoxy is laid down over the flat of the drum after each winding. The epoxy then serves to hold the spacer in position and at the same time, when hardened, serves as the matrix to hold the various styli in the head in their correct relative positions. The epoxy used in one embodiment is sold by Emerson & Cummings and is known as "Stycast No. 2655MM".

An additional advantage of the structure of this invention is that if wire 3 is wound in the grooves where wire 4 should be wound, then the two recording heads produced from a given winding can still be used although the positions of the recording heads on the drum 800 having a defined set of characteristics are reversed.

While a drum with a flat running the length of the drum was used in the prior art to form the prior art two row recording heads, the process for making the recording head of this invention unexpectedly is able to use the same double threaded drum to form the four staggered row of styli by advantageously using the depressions between adjacent rows of wires in the first and second row of styli to correctly position the wires in the third and fourth row of styli.

Write controller (FIG. 5) includes a head select matrix 120a, which allows utilization of either recording head fabrication of either recording head fabricated by the process described above. Matrix 120a allows either type of head to be properly connected into the system by controlling the bit assignments to the delayed bit buffers 104 and 106. As shown in FIGS. 9A and 9B, the bits controlling the operation of the styli in the third and fourth rows are reversed in the structure of FIG. 9B compared to the structure of FIG. 9A. Thus, as shown in FIGS. 9A and 9B, bits A and C are delivered to the same styli in both types of recording heads but bits B and D are reversed. In FIG. 9A, bit B is delivered to the recording styli in the third row while in FIG. 9B, bit B, to be in the same position in the printed line, must be delivered to the styli in the fourth row. To do this, a bit that would be delivered to RAM 104 (106) in FIG. 5, is delivered instead to RAM 106 (104) when the mirror image recording head is used.

While one embodiment of this invention has been described, those skilled in the art will recognize that other embodiments are capable of being implemented based upon the principles of this invention. The above description is intended not to be limiting but merely descriptive.

What is claimed is:

1. A recording head comprising four staggered rows of styli wherein the styli in each row are spaced two styli diameters apart center-to-center, each styli having a substantially circular cross-section, each row being separated from the adjacent row by a distance in excess of the diameter of each styli and each row being staggered relative to the adjacent row or rows by at least one-half diameter of the styli, and wherein the second row of styli is staggered by one styli diameter relative to the first row, the third row of styli is staggered by one-half styli diameter relative to the first row, and the fourth row of styli is staggered by one styli diameter relative to the third row and one-half styli diameter relative to the second row.

2. Structure as in claim 1 wherein each row is spaced center-to-center from an adjacent row by two styli diameters.

3. Structure as in claim 1 wherein the diameters of the styli are greater than 5 mils.

4. Structure as in claim 3 wherein the diameters of the styli are approximately 10 mils.

5. Structure as in claim 2 wherein the diameters of the styli are greater than 5 mils.

6. Structure as in claim 5 wherein the diameters of the styli are approximately 10 mils.

7. A recording head comprising four staggered rows of styli wherein the styli in each row are spaced a distance S apart center-to-center, each styli having a substantially circular cross-section of Diameter D, each row being separated from an adjacent row by a distance in excess of the diameter of the styli and wherein each of the four rows of styli is staggered relative to the other rows so that the projections of the centers of all of the styli onto the straight line connecting the centers of the first row of styli are S/4 apart.

8. Structure as in claim 7 wherein S is 10 mils and D is approximately 4 mils.

* * * * *